Feb. 18, 1964  P. S. HOPPER  3,121,312
UNIFIED PITCH, YAW AND ROLL SHOCK CONTROL
Filed Feb. 28, 1961

INVENTOR
PHILIP S. HOPPER
BY David S. Fishman
AGENT

United States Patent Office 3,121,312
Patented Feb. 18, 1964

3,121,312
UNIFIED PITCH, YAW AND ROLL SHOCK
CONTROL
Philip S. Hopper, Manchester, Conn., assignor to United
Aircraft Corporation, East Hartford, Conn., a corporation of Delaware
Filed Feb. 28, 1961, Ser. No. 92,375
19 Claims. (Cl. 60—35.54)

This invention relates to a novel directional and roll control for a propulsion device. More particularly it relates to a novel method and apparatus for providing pitch, yaw and roll control for a propulsion device.

The problem of providing pitch, yaw and roll control is present in all flight propulsive vehicles. U.S. Patent No. 2,943,821 teaches pitch and yaw control of a vehicle by producing shock waves in a supersonic discharge flow. However, that system makes no provision for roll control, and must depend for this on a separate system.

The present invention incorporates a modified exhaust nozzle and provides a unified shock wave system for pitch, yaw and roll control.

Accordingly, one feature of this invention is a shock wave system for pitch, yaw and roll control which eliminates the need for all other attitude controls.

Still another feature of this invention is a shock wave control system which operates in an exhaust nozzle, at least a part of which is substantially elliptical in shape, to provide pitch, yaw and roll control.

Another feature of this invention is a unified shock wave control system for use in any propulsive vehicle which has a supersonic exhaust stream.

Still another feature of this invention is a supersonic exhaust nozzle, at least a part of which is substantially elliptical, in which pitch, yaw and roll control is achieved by selective injection of a fluid into the exhaust stream at the elliptical part.

Still another feature of this invention is a shock wave control system wherein directional control is obtained by fluid injection through an exhaust nozzle into a supersonic exhaust stream, the nozzle wall being symmetrical about the directional injection points, and wherein roll control is achieved by fluid injection through an exhaust nozzle into a supersonic exhaust stream, the nozzle wall being nonsymmetrical about the roll injection points.

Other features and advantages will be apparent from the specification and claims, and from the accompanying drawings which illustrate an embodiment of the invention.

The present invention will be described in connection with the combustion chamber and the exhaust nozzle of a rocket. However, it is to be expressly understood that the present invention is applicable to any propulsive vehicle which has a supersonic exhaust stream, and is not in any way limited to the rocket configuration to be discussed herein.

Figure 1:
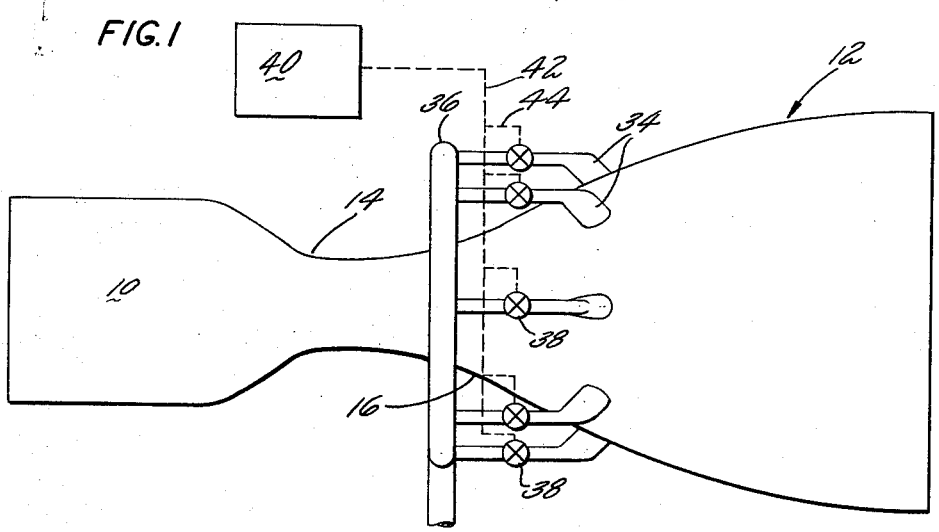
FIG. 1 is a view of a supersonic exhaust nozzle incorporating the present invention.

Referring to FIG. 1, a rocket combustion chamber 10 and exhaust nozzle 12 are shown. Exhaust nozzle 12 consists of a convergent section 14 and a divergent section 16. The combustion gases from combustion chamber 10 pass through nozzle 12 and in a well-known manner are accelerated to a supersonic speed.

Figure 2:
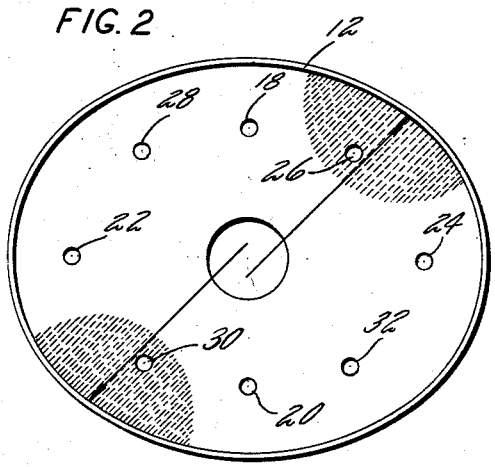
FIG. 2 is a view looking into the exhaust nozzle of FIG. 1 from the discharge end of the nozzle.

Referring now to FIG. 2, it can be seen that exhaust nozzle 12 is substantially elliptical in shape. For purposes of clarity and simplicity exhaust nozzle 12 will be described as being substantially elliptical throughout its entire length. However, it is to be expressly understood that it would be sufficient for the present invention to have only a part of nozzle 12 of substantially elliptical shape.

A plurality of openings are provided in the elliptical wall of exhaust nozzle 12. Openings 18 and 20 are placed on the minor axis of the ellipse, and openings 22 and 24 are placed on the major axis of the ellipse. Openings 26, 28, 30 and 32 are positioned in the quarter-ellipses and are angularly displaced from the major and minor axes. Openings 26 and 30 are diagonally opposite to each other. That is, a line drawn between openings 26 and 30 will pass through the intersection of the major and minor axes of the ellipse. Likewise, openings 28 and 32 are located diagonally opposite to each other.

Each opening in the wall of the exhaust nozzle is in communication with a supply line 34, and supply lines 34 communicate with manifold 36. Manifold 36 is supplied from a source (not shown) with a liquid such as hydrazine, or manifold 36 could be supplied with gaseous hydrogen from the main hydrogen supply of a rocket system which uses hydrogen and liquid oxygen for propellants. A normally closed control valve 38 is placed in each supply line 34 between manifold 36 and the opening in the wall of nozzle 12.

Valves 38 are selectively operated by control 40. Conduit 42 carries individual electric lines 44 to each of the valves 38 to selectively operate valves 38 in response to signals from control 40. Control 40 may be of any well-known automatic pilot type which is responsive to pitch, yaw and roll of the vehicle on which it is mounted, and may be of the well-known gyroscope type or such as is disclosed in U.S. Patents Nos. 2,619,623 and 2,733,878. As applied to the present invention, the signals from an automatic pilot which would ordinarily actuate the rudder of an aircraft are used to actuate the control valves 38 leading to the yaw control injection points, the signals which would ordinarily actuate the elevators are used to actuate the valves 38 leading to the pitch control injection points, and the signals which ordinarily actuate the ailerons are used to actuate the valves 38 leading to the roll control injection points.

As taught in U.S. Patent No. 2,943,821, the injection of a fluid into a supersonic exhaust stream will create a shock and increase the pressure on the wall of the exhaust nozzle. Control valves 38 are normally closed. However, any deviations in pitch or yaw of the rocket will be sensed by control 40 and a signal will go to the appropriate valve 38 via the appropriate electric lead 44 to open a supply line 34 and inject a fluid into the supersonic exhaust stream through one of the axes-positioned openings. For example, if the vehicle should veer off course with its nose pointed in a downward direction, the valve 38 in supply line 34 leading to opening 20 would be opened and a fluid would be injected into the supersonic exhaust stream at this point. A shock wave would be created, and the attendant increase in pressure behind the shock wave will produce a force unbalance on the wall of the nozzle thereby providing a moment about the center of gravity of the vehicle (assumed to be upstream of the injection points) to return the vehicle to its proper course. In a similar manner, a signal from control 40 would open the valve 38 in the line 34 leading to opening 18 so that fluid could be injected through opening 18 for pitch deviation in the opposite direction. Also, signals from control 40 will open the valves 38 leading to openings 22 and 24 for yaw deviation. It will be apparent that the pitch and yaw injection points can be operated simultaneously in response to signals delivered by lines 44 to the valves 38 leading to the pitch and yaw injection points.

The introduction of fluid into the supersonic exhaust stream produces a conical shock wave which is symmetrical about the injection point. When the fluid is introduced through one of the axis-position openings, the summation of forces acting on the nozzle wall are equivalent to a force acting along the axis. This is so because the elliptical wall of the nozzle is symmetric about the major and minor axes. However, in accordance with the present invention, when fluid in introduced through the quarter-ellipse positioned openings 26, 28, 30 and 32 a different result is obtained. For example, the elliptical wall of nozzle 12 is not symmetrical about a line passing from the intersection of the major and minor axes to injection point 26. Although fluid injection through opening 26 produces a symmetric conical shock wave, the loading on the wall of nozzle 12 will be unbalanced. That is, the summation of forces acting on the wall will not pass through the intersection of the major and minor axes. The pressure loading on the wall and the resultant force are shown by the shaded area and the arrow in FIG. 2. A similar result is obtained when fluid is introduced through opening 30. Thus it can be seen that the simultaneous introduction of fluid into the supersonic exhaust stream at diagonally opposite injection points in alternate quarter-ellipses will produce a couple about the center of the ellipse. Introducing fluid through the openings 26 and 30 in an alternate pair of quarter-ellipses produces a counterclockwise couple, and fluid introduction through openings 28 and 32 in the other pair of alternate quarter-ellipses produces a clockwise couple. Any undesired roll of the rocket will be sensed by control 40 which will operate the appropriate valve 38 to introduce fluid into the appropriate alternate quarter-ellipses to provide roll control.

It the vehicle goes into an undesired clockwise roll, control 40 will act through lines 44 to simultaneously open valves 38 in the lines 34 leading to openings 26 and 30. Fluid will then be introduced into the supersonic exhaust stream to produce shock waves about openings 26 and 30 and produce a counterclockwise couple in the manner above described. Similarly, if the vehicle experiences an undesired counterclockwise roll fluid will be introduced through openings 28 and 32 to produce a clockwise roll.

It will be apparent that the roll control operates simultaneously with the pitch and yaw controls. For best results the openings in alternate quarter-ellipses should be diagnoally opposed, i.e., a line drawn between them should pass through the center of the ellipse, and they should preferably lie on a line which bisects the angle between the major and minor axes. However, they are by no means limited to this configuration and may either be nondiagonally opposed, or at other than a 45° angle to the major and minor axes, or both.

As has been pointed out, the roll couples are produced because the nozzle wall is not symmetric about the quarter-ellipse injection points 26, 28, 30 and 32. Therefore, it should be apparent the shape of the nozzle wall need not be exactly elliptical, it being sufficient if it is only approximately elliptical, the important consideration being that the nozzle wall be symmetrical in the area of the pitch and yaw control openings and nonsymmetrical in the area of the roll control openings.

Figure 3:
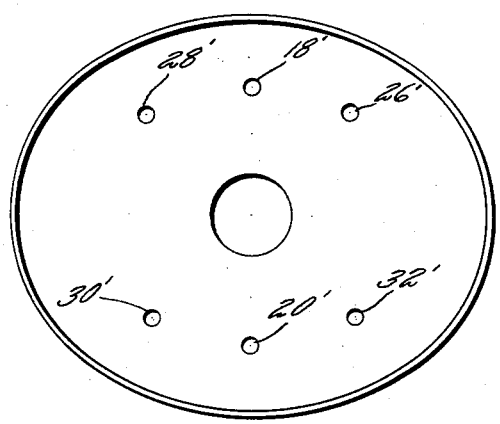
FIG. 3 is a view similar to FIG. 2 incorporating a modification.

An alternate structure is shown in FIG. 3 in which the yaw control openings 22 and 24 have been eliminated. In the structure shown in FIG. 3, openings 18' and 20' are used for pitch control, and the openings in alternate quarter-ellipses are used for roll control as in FIG. 2. However, yaw control is achieved by the simultaneous injection of fluid through openings 28' and 30', or 26' and 32'. Similarly, the openings could be retained on the major axis for yaw control, and openings 18' and 20' could be eliminated and pitch control achieved by the simultaneous injection of fluid through openings 26' and 28', or 30' and 32'.

As was pointed out previously, nozzle 12 was considered to be elliptical throughout its entire length. However, for the purposes of this invention it would be sufficient for the nozzle to have an elliptical shape only in the area of the fluid injection and for a short distance downstream thereof.

It is to be understood that the invention is not limited to the specific embodiment herein illustrated and described but may be used in other ways without departure from its spirit as defined by the following claims.

I claim:

1. In a propulsive vehicle, an exhaust nozzle, means for generating a supersonic flow in said nozzle, at least a part of said nozzle having a substantially elliptical shape in the area of supersonic flow, and means for selectively creating shock waves in said elliptical part of the nozzle at two substantially radially opposed locations removed from the major and minor axes of said elliptical part to induce forces on the wall of said nozzle in the elliptical part thereof for roll control.

2. A propulsive vehicle as in claim 1 in which the means for selectively creating shock waves includes means for introducing a fluid into said nozzle.

3. A propulsive vehicle as in claim 1 in which the means for selectively creating shock waves includes a plurality of openings in the wall of said nozzle, and means for selectively introducing a fluid into said nozzle through said openings.

4. In a propulsive vehicle, an exhaust nozzle, at least a part of said nozzle having a substantially elliptical shape, means for generating a supersonic flow through said elliptical part, first injection means for injecting fluid into said nozzle to create shock waves in said elliptical part in each quarter-ellipse removed from the major and minor axes of said elliptical part, any of said first injection means for creating a shock wave in any quarter-ellipse being substantially radially opposed to the first injection means for creating a shock wave in an alternate quarter-ellipse, second injection means on one of the axes of said elliptical part for injecting fluid into said nozzle to create shock waves, and means for selectively actuating said first and second injection means, said last mentioned means including means for selectively introducing fluid into said nozzle through two of said first injection means to create shock waves in two adjacent quarter-ellipses and through said second injection means for directional control and means for selectively introducing fluid into alternate quarter-ellipses for roll control.

5. In a propulsive vehicle, an exhaust nozzle, means for generating a supersonic flow in said nozzle, and control means for selectively creating shock waves in said nozzle for roll control, said control means including at least one pair of substantially radially opposed injection means for injecting a fluid into said nozzle, at least a part of said exhaust nozzle being asymmetric about said pair of injection means.

6. In a propulsive vehicle, an exhaust nozzle, at least part of said nozzle being asymmetric about a pair of substantially radially opposed points, means for generating a supersonic flow through said nozzle, and means for injecting fluid into said nozzle to generate shock waves and induce an unbalanced force on said nozzle at each of said points to produce a couple for roll control.

7. A propulsive vehicle as in claim 6 wherein at least a part of said nozzle is asymmetric about a second pair of substantially radially opposed points, and including means for injecting fluid into said nozzle to generate shock waves and induce an unbalanced force on said nozzle at each of said second points to induce a couple for roll control opposite to said first-mentioned couple.

8. In a propulsive vehicle, an exhaust nozzle, means for generating a supersonic flow in said nozzle, at least a part of said nozzle having a substantially elliptical shape in the area of supersonic flow, means for selectively creating shock waves in said nozzle for pitch and yaw control, and means for selectively creating shock waves in said elliptical part at two substantially radially opposed locations removed from the major and minor axes of said elliptical part for inducing forces on the wall of said nozzle in the elliptical part thereof for roll control.

9. A propulsive vehicle as in claim 8 in which the means for selectively creating shock waves includes a plurality of injection means for injecting fluid into said nozzle, and means for selectively actuating said injection means to introduce fluid into said nozzle through said injection means.

10. In a propulsive vehicle, an exhaust nozzle, at least part of said nozzle having a substantially elliptical shape, means for generating a supersonic flow through said elliptical part, injection means for injecting fluid into said nozzle to create shock waves to induce forces on the wall of said nozzle in each quarter-ellipse of the elliptical part, and means for selectively actuating said injection means to introduce fluid into said nozzle in alternate quarter-ellipses for roll control.

11. A propulsive vehicle as in claim 10 in which the injection means are spaced 45° from the major and minor axes of the elliptical part.

12. A propulsive vehicle as in claim 10 in which the injection means for injecting fluid into any quarter-ellipse is substantially radially opposed to the injection means for injecting a fluid into an alternate quarter-ellipse.

13. In a propulsive vehicle, an exhaust nozzle, at least a part of said nozzle having a substantially elliptical shape, means for generating a supersonic flow through said elliptical part, injection means for injecting fluid into said nozzle to create shock waves to induce forces on the wall of said elliptical part in each quarter-ellipse, means for selectively actuating said injection means to introduce a fluid into said nozzle in a pair of alternate quarter-ellipses to produce a clockwise couple about the center of said elliptical part for clockwise roll control, and means for selectively actuating said injection means to introduce a fluid into said nozzle in the other pair of alternate quarter-ellipses to produce a counterclockwise couple about the center of said elliptical part for counterclockwise roll control.

14. A propulsive vehicle as in claim 13 in which the injection means are spaced 45° from the major and minor axes of said elliptical part.

15. A propulsive vehicle as in claim 13 in which the injection means for injecting fluid into the nozzle to create a shock wave in any quarter-ellipse is substantially radially opposed to the injection means for injecting fluid into the nozzle to create a shock wave in an alternate quarter-ellipse.

16. In a propulsive vehicle, an exhaust nozzle, at least a part of said nozzle having a substantially elliptical shape, means for generating a supersonic flow through said elliptical part, first injection means for injecting fluid into said nozzle to create shock waves in said elliptical part to induce forces on the wall of said nozzle in axial alignment with the major and minor axes of the ellipse, second injection means for injecting fluid into said nozzle to create shock waves in said elliptical part to induce forces on the wall of said elliptical part in each quarter-ellipse removed from said axes, means for selectively actuating said first injection means to introduce fluid into said nozzle for directional control, and means for selectively actuating said second injection means to introduce fluid into said nozzle in a pair of alternate quarter-ellipses for roll control.

17. In a propulsive vehicle, an exhaust nozzle, at least a part of said nozzle having a substantially elliptical shape, means for generating a supersonic flow through said elliptical part, first injection means for injecting fluid into said nozzle to create shock waves in said elliptical part in axial alignment with major and minor axes of the ellipse, second injection means for injecting fluid into said nozzle to create shock waves in said elliptical part in each quarter-ellipse removed from said axes, means for selectively actuating said first injection means to introduce fluid into said nozzle to create shock waves for directional control, and means for selectively actuating said second injection means to introduce fluid into said nozzle to create shock waves in a pair of alternate quarter-ellipses for roll control, the second injection means for creating a shock wave in any quarter-ellipse removed from the axes being substantially radially opposed to the second injection means for creating a shock wave in an alternate quarter-ellipse removed from the axes.

18. In a propulsive vehicle, an exhaust nozzle, means for generating a supersonic flow through said exhaust nozzle, first means for injecting a fluid into said nozzle to generate shock waves to induce forces on the wall of said nozzle for directional control, second means for injecting a fluid into said nozzle to generate shock waves to induce forces on substantially radially opposed portions of said nozzle for roll control, at least a part of the nozzle wall adjacent said first injection means being symmetric about said first injection means and at least a part of the nozzle wall adjacent said second injection means being asymmetric about said second injection means, and means for selectively actuating said first injection means for directional control and said second injection means for roll control.

19. In a propulsive vehicle, an exhaust nozzle, means for generating a supersonic flow through said nozzle, and means including a plurality of force generating elements for generating a force coupling on the wall of said nozzle at substantially radially opposed points on the wall of said nozzle for roll control, said exhaust nozzle being asymmetric about said force generating elements.

References Cited in the file of this patent

UNITED STATES PATENTS

| | | |
|---|---|---|
| 2,940,251 | Prentiss | June 14, 1960 |
| 2,943,821 | Wetherbee | July 5, 1960 |
| 2,952,123 | Rich | Sept. 13, 1960 |

FOREIGN PATENTS

| | | |
|---|---|---|
| 1,192,929 | France | Apr. 27, 1959 |
| 748,983 | Great Britain | May 16, 1956 |